United States Patent [19]
Cece et al.

(10) Patent No.: US 6,591,182 B1
(45) Date of Patent: Jul. 8, 2003

(54) DECISION MAKING PROCESS AND MANUAL FOR DIAGNOSTIC TREND ANALYSIS

(75) Inventors: Vito N. Cece, Mason, OH (US); Christopher M. Henlein, Mason, OH (US); Charles L. Abernathy, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/515,261

(22) Filed: Feb. 29, 2000

(51) Int. Cl.$^7$ ............................................. G06F 19/00
(52) U.S. Cl. ........................... 701/100; 701/29; 701/30; 477/30
(58) Field of Search .......................... 701/29, 100, 30, 701/107; 702/182, 183, 184, 185; 477/30

(56) References Cited

U.S. PATENT DOCUMENTS

| | | | | |
|---|---|---|---|---|
| 5,408,412 A | * | 4/1995 | Hogg et al. | 364/424.03 |
| 5,951,611 A | | 9/1999 | La Pierre | 701/29 |
| 6,216,066 B1 | * | 4/2001 | Goebel et al. | 701/29 |

* cited by examiner

*Primary Examiner*—Yonel Beaulieu
(74) *Attorney, Agent, or Firm*—V G Ramaswamy; Pierce Atwood (57) ABSTRACT

A decision making process for evaluating performance shifts identified during a diagnostic trend analysis of gas turbine engine data includes first determining whether each performance shift is actionable, and then determining what maintenance action is required for actionable performance shifts. The maintenance action is determined by identifying potential causes of the actionable performance shifts and ranking the identified potential causes in most likely order. A manual is provided for guiding a user through the decision making process. The manual includes a flow chart flow chart setting forth the steps of the decision making process and a number of tables used in the process. The tables include a false data check table having a number of questions designed to determine whether performance shifts can be attributed to a cause not related to an engine condition requiring maintenance, a persistence and magnitude table for indicating whether a performance shift's persistence and magnitude is sufficient to consider taking action on the performance shift, a notification criteria table having a number of questions designed to determine whether the gas turbine engine data indicates that an urgent condition may exist, and traditional and historical pattern match tables that identify potential causes of performance shift.

28 Claims, 6 Drawing Sheets

PERSISTENCE AND MAGNITUDE TABLE

| MAGNITUDE | | PERSISTENCE (# OF RAW POINTS) | | |
|---|---|---|---|---|
| | | LOW | MED. | HIGH |
| | | 1 TO 2 | 3 TO 5 | >6 |
| | ΔEGT °C | | | |
| LARGE | >+/−20 | 1a. Y | 1b. Y | 1c. Y |
| MED. | 12 TO 19.9 | 1d. N | 1e. Y | 1f. Y |
| SMALL | 7 TO 11.9 | 1g. N | 1h. Y | 1i. Y |
| | | 1 TO 2 | 3 TO 5 | >6 |
| | ΔFF % | | | |
| LARGE | >+/−1.3 | 2a. Y | 2b. Y | 2c. Y |
| MED. | >+/−(0.5 TO 1.29) | 2d. N | 2e. Y | 2f. Y |
| SMALL | >+/−(0.2 TO .59) | 2g. N | 2h. N | 2i. Y |
| | | 1 TO 2 | 3 TO 5 | >6 |
| | ΔCORE TEMP. % | | | |
| LARGE | >+/−1.3 | 3a. Y | 3b. Y | 3c. Y |
| MED. | >+/−(0.5 TO 1.29) | 3d. N | 3e. Y | 3f. Y |
| SMALL | >+/−(0.2 TO .59) | 3g. N | 3h. N | 3i. Y |
| | | 1 TO 2 | 3 TO 5 | >6 |
| | EGTHDM °C | | | |
| LARGE | >+/−20 | 4a. Y | 4b. Y | 4c. Y |
| MED. | 12 TO 19.9 | 4d. N | 4e. Y | 4f. Y |
| SMALL | 7 TO 11.9 | 4g. N | 4h. Y | 4i. Y |

FIG. 4

TRADITIONAL PATTERN MATCH TABLE

| ΔEGT | ΔFF | ΔCORE TEMP. | CAUSE CATEGORIES (POTENTIAL CAUSES) |
|---|---|---|---|
| ↑ | ↑ | ↓ | CORE DETERIORATION |
| +28-30° | +2% | -0.3% | FOD- FOLLOWED BY HPT DETERIORATION |
| ↑ | ↑ | ↑ | VBV & AIR LEAKAGE |
| +30° | +3% | +1.4% | VBV GEAR-MOTOR STOP MECHANISM SEIZED |
| +12° | +1.8% | +0.3% | AIR LEAKAGE THROUGH FUEL NOZZLE SEALS |
| +30° | +3% | +0.6% | VBV SYSTEM FAILURE |
| +10° | +1.0% | +0.2% | 5TH OR 9TH STG CUSTOMER BLEED LEAKAGE |
| ~0 | ~0 | ↓/↑ | VSV, MEC, CIT SENSOR |
| +5° | +0.6% | -0.8% | MEC REMOVE & REPLACE FOR LEAKAGE-THIS CHANGE FOLLOWED |
| ~0 | ~0 | -0.7% | CIT SENSOR LOSS HELIUM CHARGE- LEADS TO VSV TRACKING MORE OPEN |
| ~0 | ~0 | +1% | VSV OFF SCHEDULE CLOSED- COULD CAUSE HOT STARTS |
| ↓/↑ | ↓/↑ | ↓/↑ | INSTRUMENTATION PROBLEMS |
| +14° | -3.8% | +0.7% | TAT GAGE FAILURE |
| -20° | -6% | -1.4% | N1 INDICATOR ACCURACY/FAILURE |
| +20° | ~0 | ~0 | EGT CONNECTOR |
| +30° | ~0 | ~0 | EGT INDICATOR PROBLEM |
| -0 | +2% | ~0 | FUEL INDICATOR ACCURACY/ FAILURE |

FIG. 5

HISTORICAL PATTERN MATCH TABLE

| ID | ΔEGT | ΔFF | ΔCORE TEMP. | EGT-HDM | CAUSES CATEGORIES (POTENTIAL CAUSES) |
|---|---|---|---|---|---|
| | ↑ | ↑ | ↓ | | CORE DETERIORATION |
| 261 | +10 | − | | | HPT SHROUD BURN THROUGH |
| 209 | 30−40 | ↑ | ↓ | | HPT SHROUD BURN THROUGH |
| 218 | +20 | − | − | ↓ | HPT SHROUD BURN THROUGH |
| 260 | +60 | − | − | +50 | EGT PROBE SHEARED− LPT S2 NOZZLE CLOCKING |
| | ↑ | ↑ | ↑ | | VBV & AIR LEAKAGE |
| 278 | +15 | +1.5% | +0.4% | | 2 VBV DOORS STUCK OPEN |
| 197 | ↑ | ↑ | ↑ | | VBV DOORS STUCK OPEN |
| | ~0 | ~0 | ↓/↑ | | VSV, MEC, CIT SENSOR |
| 181 | − | − | +0.75% | | FAILURE TO RIG VSV'S AFTER MAINTENANCE |

FIG. 6

DECISION MAKING PROCESS AND MANUAL FOR DIAGNOSTIC TREND ANALYSIS

BACKGROUND OF THE INVENTION

This invention relates generally to aircraft engines and more particularly to a process for providing guidance on the evaluation and disposition of diagnostic trend and fault data from such engines.

Gas turbine engines used for powering aircraft in flight are routinely subject to various maintenance procedures as part of their normal operation. To aid in the provision of such engine services, aircraft are commonly provided with onboard engine performance monitoring equipment that collects relevant trend and fault data during engine operation. Such data can be recorded onboard and accessed later by ground maintenance personnel or, alternatively, can be remotely transmitted to ground locations during flight operations. It is not uncommon for providers of engine maintenance services to operate a diagnostic center where trend data, fault data, shop records and OEM databases are integrated and used to develop optimal line maintenance strategies.

In diagnostic trend analysis, certain trend parameters, such as exhaust gas temperature, engine fuel flow, core speed, etc., that are indicative of overall engine performance and/or condition are compared to a parametric baseline for the engine. The parametric baseline is generally empirically derived or generated with an engine cycle model. Current engine trend data analysis techniques rely, in general, on visual examination of trend data to detect symptoms indicative of a need for inspection or maintenance. This approach is labor intensive, and requires considerable experience and expertise to identify real trend changes from false data. Consequently, much of the value of trending can be lost unless a user is dedicated to frequent detailed analyses of engine trend data by highly experienced personnel.

It is also known to utilize a statistical analysis technique to perform automatic detection of trend shifts by computation of a slope with a threshold to trigger an "alarm." Although this method of trend analysis works well, in some cases small changes may be missed or several flights may be required before the trend change can be identified. This, of course, delays detection of a potentially critical situation. In addition, this technique is not able to discern scatter and sensor drift from real engine changes. Consequently, considerable experience is still required to interpret detected symptoms. This has resulted in diminished use of trend information as a diagnostic tool.

It would be desirable, then, to have a decision making process that facilitates the evaluation and disposition of diagnostic trend and fault data while relying less on highly experienced personnel.

BRIEF SUMMARY OF THE INVENTION

The above-mentioned need is met by the present invention that provides a decision making process for evaluating performance shifts identified during a diagnostic trend analysis of gas turbine engine data. The process includes first determining whether each performance shift is actionable, and then determining what maintenance action is required for actionable performance shifts. The maintenance action is determined by identifying potential causes of the actionable performance shifts and ranking the identified potential causes in most likely order.

A manual is provided for guiding a user through the decision making process. The manual includes a flow chart flow chart setting forth the steps of the decision making process and a number of tables used in the process. The tables include a false data check table having a number of questions designed to determine whether performance shifts can be attributed to a cause not related to an engine condition requiring maintenance, a persistence and magnitude table for indicating whether a performance shift's persistence and magnitude is sufficient to consider taking action on the performance shift, a notification criteria table having a number of questions designed to determine whether the gas turbine engine data indicates that an urgent condition may exist, and traditional and historical pattern match tables that identify potential causes of performance shift.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
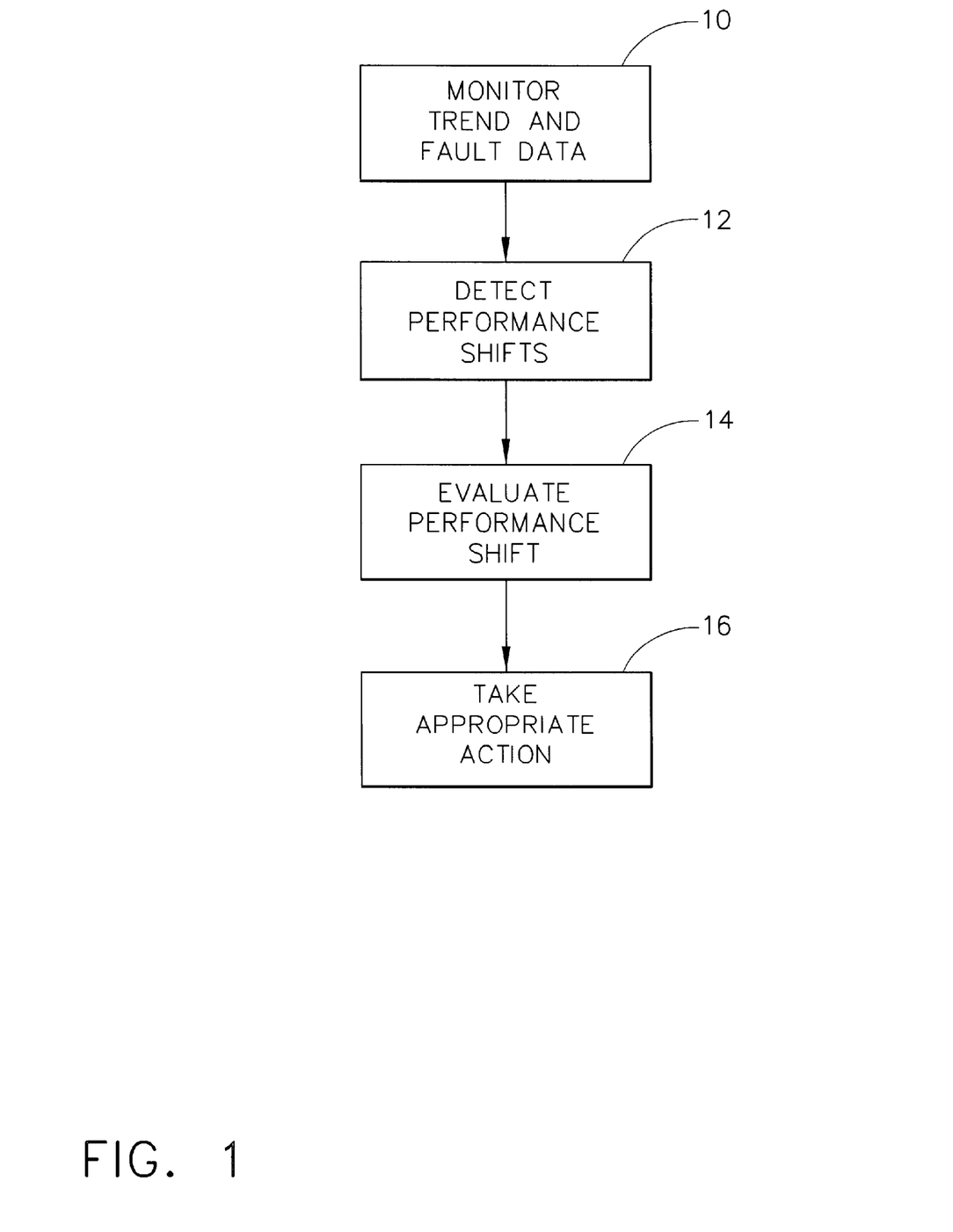
FIG. 1 is a flow chart illustrating the steps employed in a diagnostic trend analysis including the decision making process of the present invention.

Referring to the drawings wherein identical reference numerals denote the same elements throughout the various views, FIG. 1 is a flow chart illustrating a diagnostic trend analysis process for a gas turbine engine. The first step, shown at block 10, is to monitor data corresponding to selected trend parameters that are indicative of overall engine performance and/or conditions. As mentioned above, raw trend data is generally obtained by means of onboard engine performance monitoring equipment. The data can be manually or automatically recorded onboard and accessed later by ground maintenance personnel. Alternatively, electronically recorded data can be transmitted to ground locations during flight operations for remote, real-time monitoring. Although the trend parameters available for use are dependent on available instrumentation, examples of suitable trend parameters include, but are not limited to, exhaust gas temperature, engine fuel flow, core speed, compressor discharge pressure, turbine exhaust pressure, fan speed, and the like.

Whatever trend parameters are utilized, they are compared to a parametric baseline for the engine. Any divergence of the raw trend data from the parametric baseline (such a divergence is referred to herein as a performance shift) may be indicative of a possible engine condition that requires maintenance. Thus, performance shifts are detected at block 12.

However, a performance shift can occur even when no underlying abnormal engine conditions exist. That is, not all performance shifts indicate a need for inspection or maintenance of the engine. Accordingly, at block 14, the detected performance shift is evaluated to determine if the abnormal data is actionable (i.e., is inspection or maintenance required), and if so, what maintenance action should be taken to correct the cause of the performance shift. At block 16, the final step of the process is to carry out the appropriate action as determined in the evaluation step of block 14.

Figure 2:
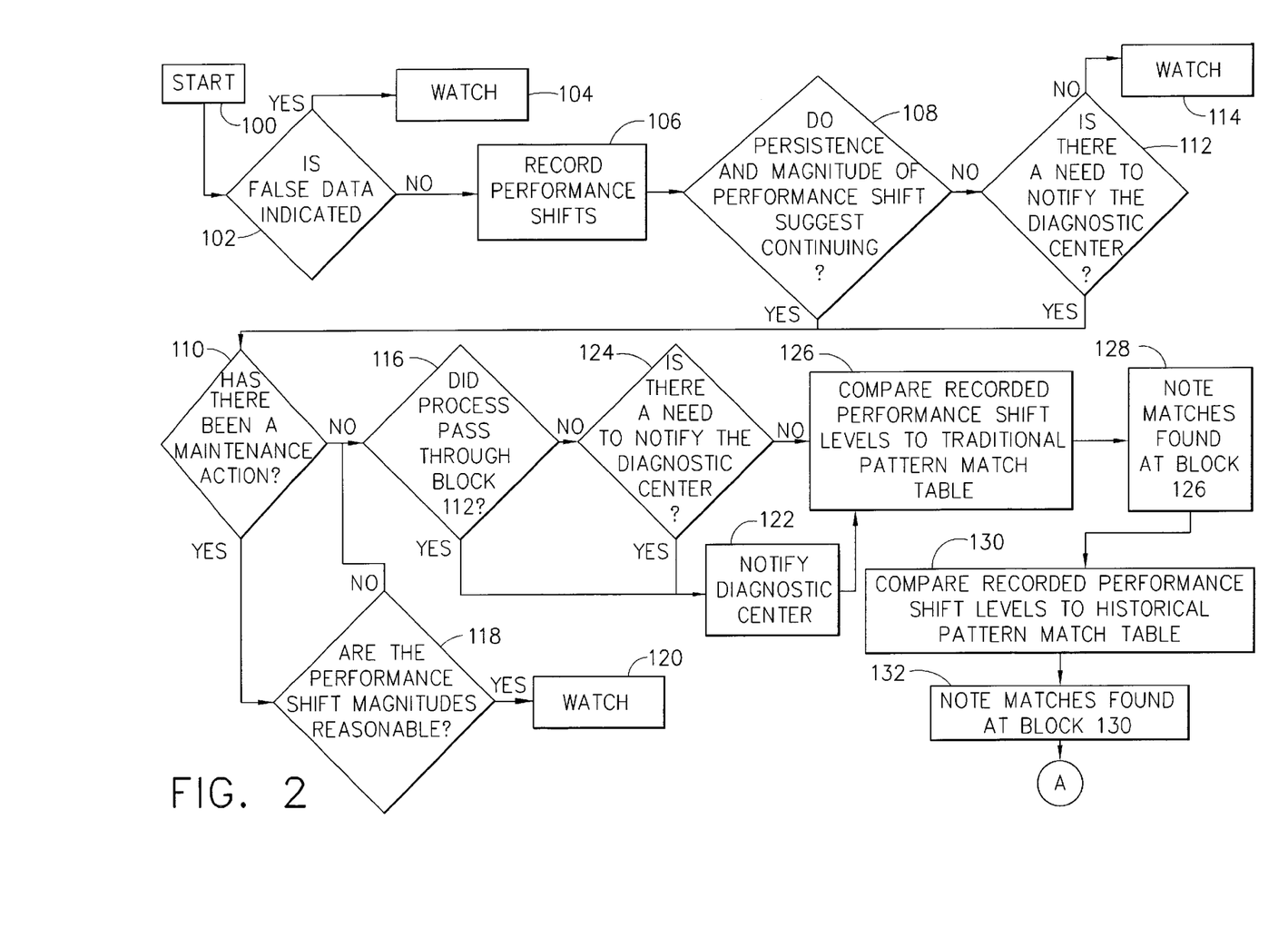
FIG. 2 is a flow chart illustrating the initial portion of one embodiment of the decision making process of the present invention.
Figure 3:
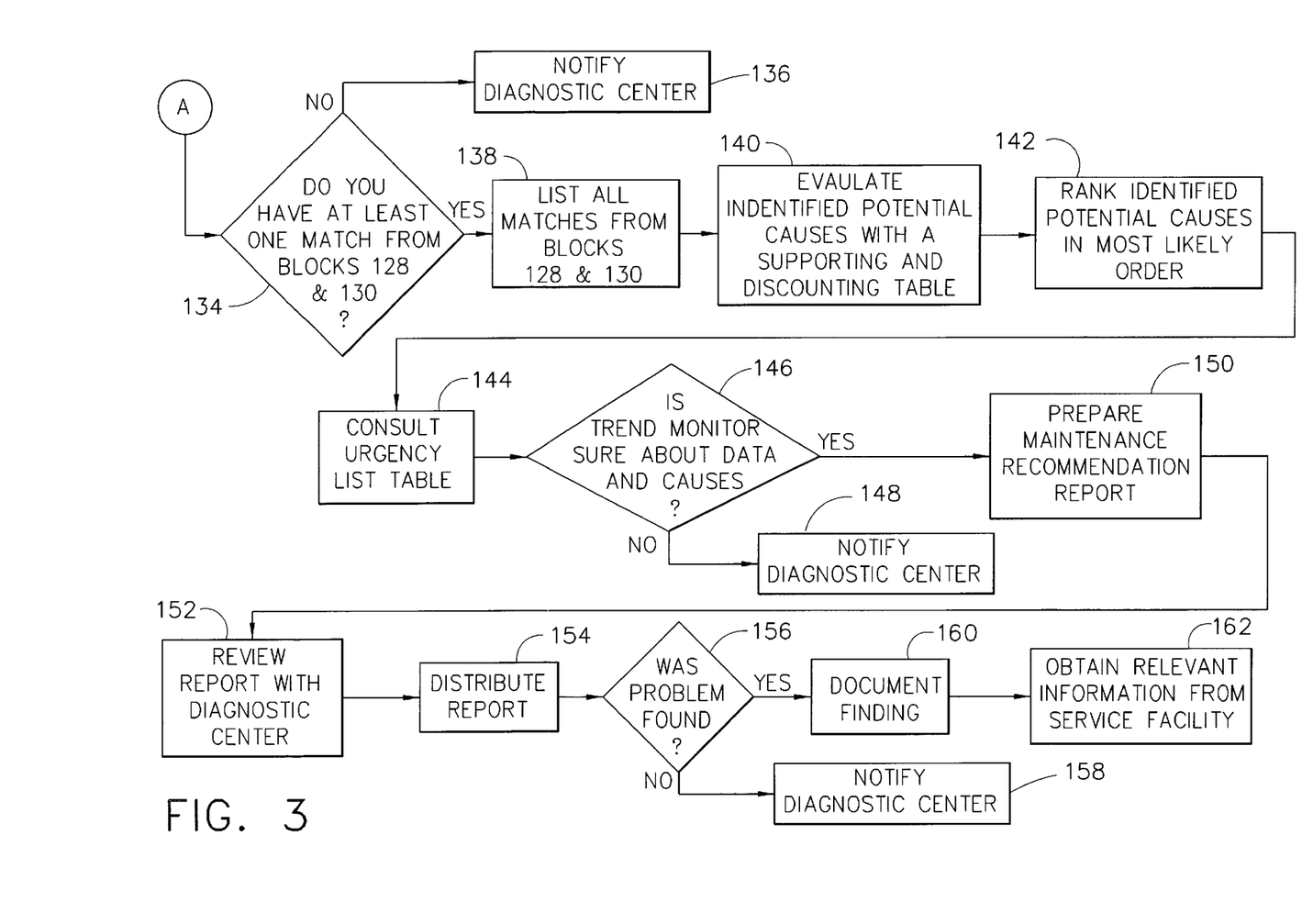
FIG. 3 is a flow chart illustrating the remaining portion of the decision making process of FIG. 2.

Referring now to FIGS. 2 and 3, a flow chart is shown that illustrates in detail a decision making process for carrying out the evaluation and disposition of detected performance shifts as indicated in block 14 of FIG. 1. By way of example only, the decision making process will be described with respect to a trend analysis process in which the monitored trend parameters are the exhaust gas temperature, fuel flow and core speed of the engine. However, it should be noted that the present invention is not limited to these particular trend parameters and could be used with any suitable set of trend parameters.

The decision making process is designed to be carried out by a person, referred to herein as the trend monitor, that does not necessarily have a lot of experience or knowledge in trending analysis. Thus, as will be described in more detail below, the trend monitor is supported by more experienced and/or knowledgeable personnel that assist trend monitors through out the operation. For the sake of convenience, such personnel will be collectively referred to herein as the "diagnostic center." As will be appreciated from the following detailed description, the decision making process can be implemented either electronically in the form of an interactive computer program, or on paper in the form of a printed manual.

The process starts at block 100 in FIG. 2, upon detection of a performance shift (block 12 of FIG. 1), and proceeds to block 102, where a false data check is performed. A false data check comprises determining whether the performance shift can be attributed to a cause not related to an engine condition requiring maintenance. This is accomplished by consulting a false data check table having a number of questions. The questions are designed to distinguish true performance shifts and false data shifts. For example, one such question could be whether the other engine shows the same performance shift. That is, if both engines in a twin engine aircraft experience the same performance shift, then it is likely that the cause of the shift is not related to an engine maintenance issue. Another possible false data check question could be whether the magnitude of the performance shift is excessive; for example, has the exhaust gas temperature shifted by greater than ±150° C.? Such a large performance shift would tend to indicate that there could be a data collection problem. Another possible question is whether the aircraft configuration has been recently changed. If so, then the reconfiguration would be the likely cause of the performance shift. Other possible questions include whether the data is manually recorded and comprises less than two raw data points and whether there is a known false data problem. These are just some examples of false data check questions; other questions are possible.

If the answer to any of the false data check questions is yes, then the performance shift may be the result of false data and the process proceeds to block 104 where the action is to watch the condition for further problems but take no other immediate action. If none of the questions are answered affirmatively, then the process proceeds to block 106 where the performance shift levels are recorded in a data record table.

Figure 4:
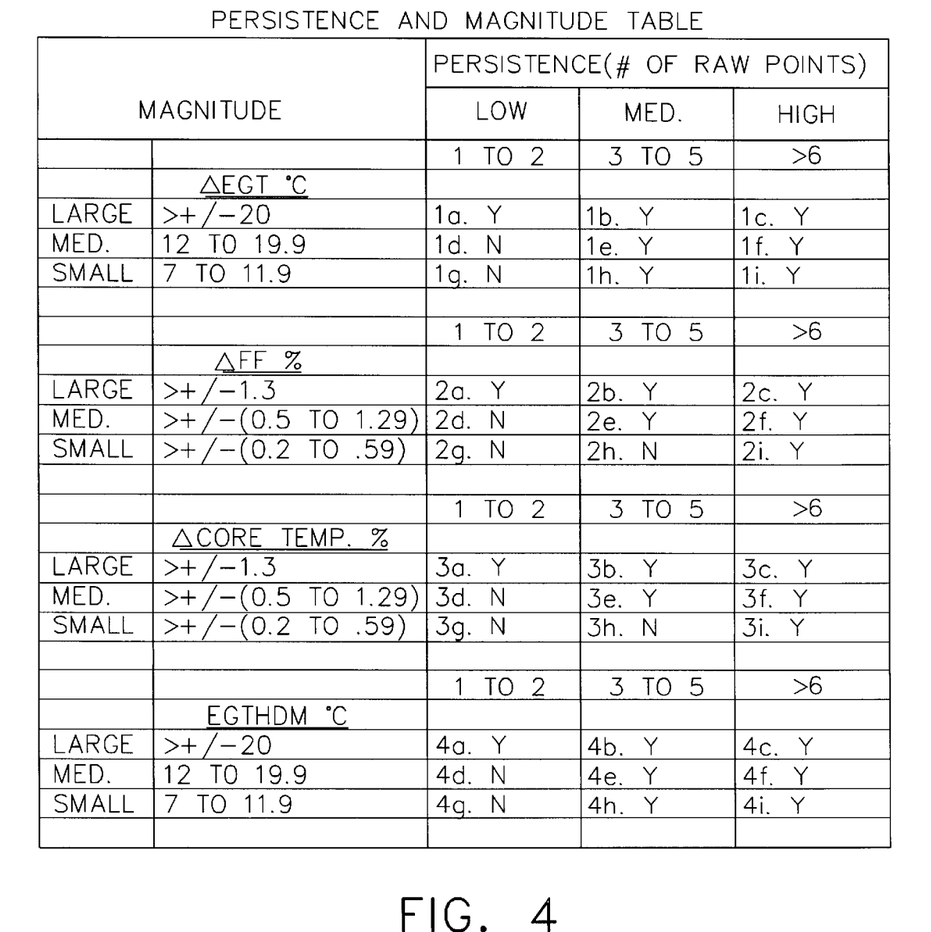
FIG. 4 shows an exemplary persistence and magnitude table used in the decision making process.

Next, at block 108, a persistence and magnitude table is consulted to determine whether the performance shift is of such severity as to suggest continuing the process. Specifically, the persistence and magnitude table will indicate whether the detected performance shift is sufficient to consider the performance shift to be actionable. An exemplary persistence and magnitude table is shown in FIG. 4. The persistence and magnitude table weights, for each trend parameter, various magnitudes of performance shift against various persistence levels of performance shift. As used herein, "persistence" refers to the number of raw data points that diverge from the parametric baseline, wherein a large number of divergent data points is indicative of a high persistence.

As seen in FIG. 4, the performance shift magnitude for each trend parameter is divided into large, medium and small categories, and the persistence levels are broken down into high, medium and low categories. These categories are preferably quantified. For instance, in the illustrated example, an exhaust gas temperature performance shift of greater than 20° C. is a large magnitude, an exhaust gas temperature performance shift falling between 12° C. and 20° C. is a medium magnitude, and an exhaust gas temperature performance shift of less than 12° C. is a small magnitude. The persistence and magnitude table is organized into an array of "yes" and "no" boxes, with each box corresponding to a different pairing of the magnitude and persistence categories. Generally, the "yes" boxes will correspond to situations where the magnitude is large and/or the persistence is high, or where both the magnitude and the persistence are medium. The "no" boxes will generally correspond to the situations where the magnitude is small and the persistence is low. Results will vary when one of the magnitude and the persistence is medium and the other is small or low.

By way of example from FIG. 4, if the engine monitoring equipment detects a performance shift in which the exhaust gas temperature increased or decreased by more than 20° C., then the result would be a "yes" regardless of the persistence level. On the other hand, if the exhaust gas temperature performance shift is less than 20° C. (i.e., a medium or small magnitude), then the result would be "no" for low persistence levels (only one or two raw data points) and would be "yes" for medium (3–5 raw data points) or high (greater than 6 raw data points) persistence levels.

Thus, returning to block 108, if any of the trend parameters fall within one of the "yes" boxes of the persistence and magnitude table, then the process proceeds to block 110. On the other hand, if none of the trend parameters fall within one of the "yes" boxes of the persistence and magnitude table, then the process proceeds to block 112 where a notification criteria table is consulted. The notification criteria table comprises a series of questions that relate to whether there is a need to notify the diagnostics center where available information can be reviewed by more experienced and/or knowledgeable personnel. The questions are designed to determine whether the trend data indicates that an urgent condition may exist. This step thus provides a "process check" so as to ensure that the trend monitor does not miss an urgent engine condition. Suitable questions include, but are not limited to, the following. Does the performance shift match a known urgency pattern? In other words, there are certain performance shift patterns that are known to indicate an urgent engine condition. Is the exhaust gas temperature hot day margin (EGTHDM) below a predetermined value, such as 10° C.? Have any engine operating limits been exceeded? Is there any concern or uncertainty on the part of the trend monitor? An affirmative answer to any of these questions indicates that the diagnostic center should be notified.

If any of the notification criteria questions are answered affirmatively, then the process proceeds to block 110. If none of the notification criteria questions are answered affirmatively, then the available data is insufficient to make a decision on how to proceed. Accordingly, the process proceeds to block 114 where the action is to continue to watch the trend parameter. Specifically, the trend parameter is watched until one of three possible events occurs: a "yes" condition is reached in the persistence and magnitude table (as described above with respect to block 108), a "yes" condition is reached in the notification criteria table (as described above with respect to block 112), or the trend parameter data returns back to normal levels for a sustained period. Generally, a sustained period would be obtaining three or more consecutive raw data points. If a "yes" condition is reached in either the persistence and magnitude table or the notification criteria table, the process proceeds to block 110. If the trend parameter data returns to normal levels for a sustained period, then the process is ended.

At block 110, the process inquires whether the engine has been subject to a recent maintenance action that may have affected the trending data. If there has not been a recent maintenance action, then the process proceeds directly to block 116. If there has been a recent maintenance action, then the process proceeds to block 118. At block 118, a maintenance data effect table is consulted. The maintenance data effect table lists, for a number of maintenance actions, a corresponding limit for acceptable performance shift magnitudes for each trend parameter. That is, if the performance shift is within the table's limit for that particular trend parameter, then the performance shift can be attributed to the recent maintenance action and not some other cause. The process proceeds to block 120 where the action is to continue to watch the trend parameter. On the other hand, if the performance shift is outside the limits set in the maintenance data effect table, the process proceeds to block 116. At block 120, the process would end if the trend parameter data returns back to normal levels for a sustained period but would proceed to block 116 if the trend data parameter should subsequently fall out of limits in the maintenance data effect table.

At block 116, the process inquires whether block 112 was passed through. If yes, then the process proceeds directly to block 122. If no, then the process proceeds to block 124 where the notification criteria table is consulted in the same manner as described with respect to block 112 above. In this case, however, if none of the notification criteria questions are answered affirmatively, then the process proceeds to block 126. But if any of the notification criteria questions are answered affirmatively, then the process proceeds to block 122. At block 122, the diagnostics center is notified so that more experienced personnel can review the situation and determine if urgent action is required.

Up to this point, the process has evaluated the trend data to determine whether the detected performance shift is actionable (i.e., whether the situation calls for some sort of maintenance action). If the process reaches block 126, then this indicates that the performance shift is actionable. The next stage of the process determines what maintenance action should be taken.

Figure 5:
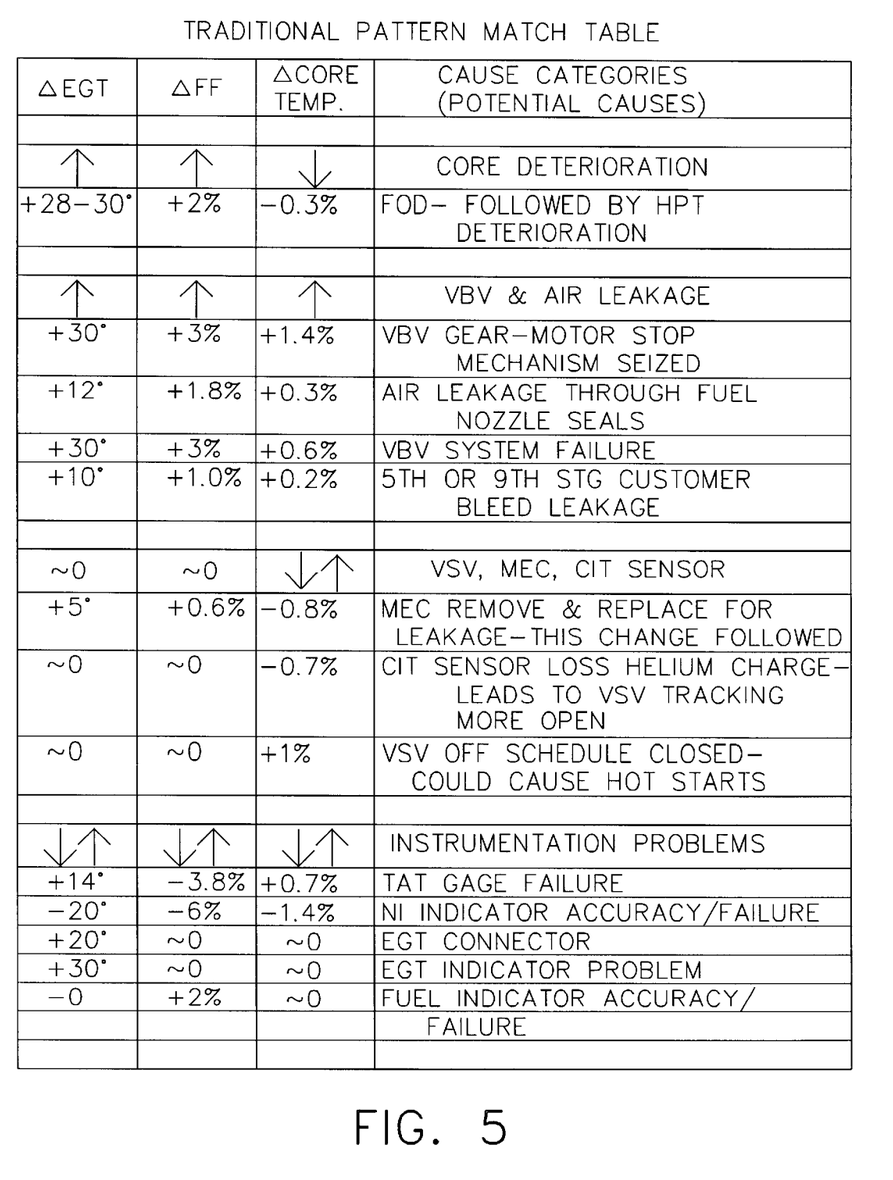
FIG. 5 shows an exemplary traditional pattern match table used in the decision making process.

At block 126, the performance shift levels recorded in the data record table at block 106 are compared to a traditional pattern match table in order to identify potential causes of performance shift. An exemplary traditional pattern match table is shown in FIG. 5. The traditional pattern match table correlates various performance shift patterns to potential causes of performance shift based on gas turbine engine theory and general experience in the maintenance of gas turbine engines. Thus, these traditional performance shift patterns can be used to identify potential causes of the detected performance shift. For example, a trend pattern in which the exhaust gas temperature and the fuel flow both have an upward trend and the core speed has a downward trend could be indicative of core deterioration induced by foreign object damage. A trend pattern in which all three of these trend parameters are increasing could be indicative of variable bleed valve air leakage. Any matches found between the recorded performance shift levels and a potential cause in the traditional pattern match table are noted as indicated at block 128.

Figure 6:
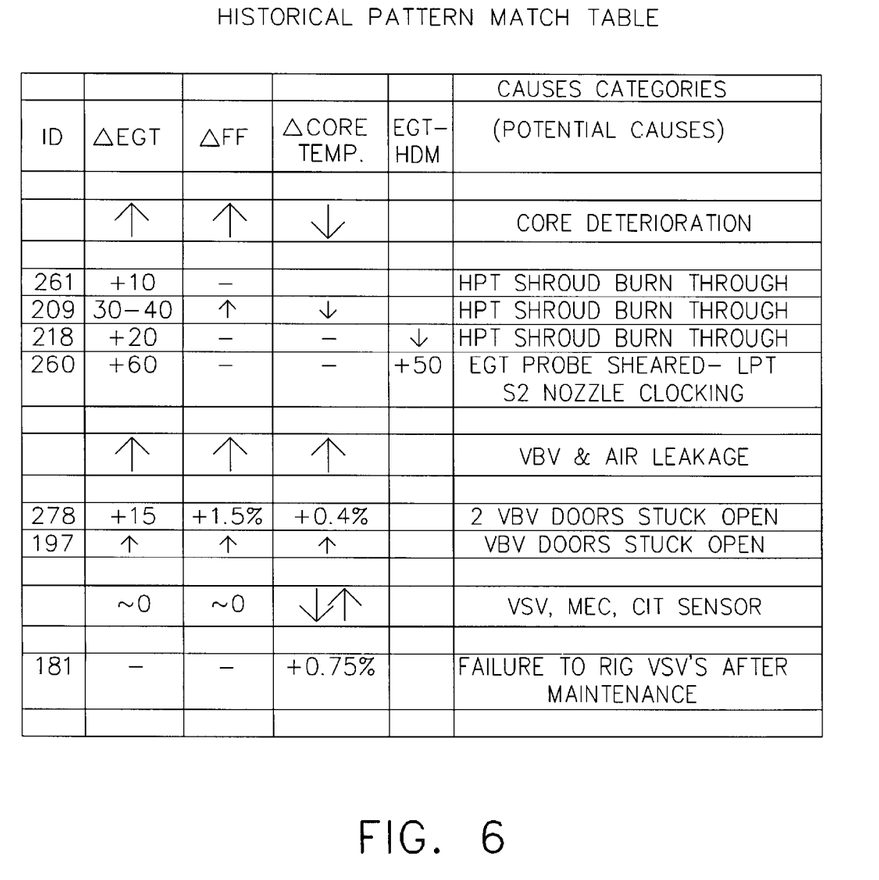
FIG. 6 shows an exemplary historical pattern match table used in the decision making process.

Even if no matches are found in the comparing step of block 126, the process continues to block 130. Here, the performance shift levels recorded in the data record table at block 106 are now compared to a historical pattern match table for the particular type of engine being monitored in order to identify potential causes of performance shift. An exemplary traditional pattern match table is shown in FIG. 6. The historical pattern match table also correlates various performance shift patterns to potential causes, but such tables are based on actual maintenance fleet experience and are thus engine specific. Thus, these historical performance shift patterns can also be used to identify potential causes of the detected performance shift. The recorded performance shift levels are compared to the appropriate historical pattern match table, and any matches found with potential causes are noted as indicated at block 132.

Turning now to FIG. 3, the process proceeds to block 134, where the inquiry is made whether any matches where found in the steps of blocks 126 and 130. If no match is found, then the process proceeds to block 136 where the diagnostics center is notified for guidance on review status. Generally, a trend monitor reaching this point in the process will not be able to utilize the process to determine an appropriate disposition and therefore must look to the diagnostic center for guidance on how to proceed. If matches are found, then the next step, indicated at block 138, is to list all of the potential causes corresponding to the matching trend patterns from the traditional pattern match table and the historical pattern match table.

The process next proceeds to block 140 where each potential cause listed in the step of block 138 is evaluated using a supporting and discounting table. The supporting and discounting table lists, for each potential causes found in the traditional and historical pattern match tables, other data that may either support or discount that particular potential cause as being the actual cause of the performance shift. For example, one of the potential causes that may be identified in the traditional and historical pattern match tables is a high pressure turbine shroud burn through. For this potential cause, the supporting and discounting table indicates that a EGTHDM shift that is similar to EGTHDM shifts experienced in cases of known high pressure turbine shroud burn through in the engine would tend to support a conclusion that a high pressure turbine shroud burn through was the cause of the performance shift. The supporting and discounting table also indicates that the number of cycles since shop visit for the engine being less than 1000 would tend to discount a conclusion that a high pressure turbine shroud burn through was the cause of the performance shift on the basis that it is unlikely that a high pressure turbine shroud burn through would occur in less than 1000 cycles.

Accordingly, at block 142, the supporting and discounting table is used to rank the potential causes identified in the step of block 138 in a priority list (i.e., a list of the identified potential causes ranked in most likely order-from most likely cause to least likely cause). Although the support and discount table is primarily used to create the priority list, fleet assessment Pareto charts can also be used to assist ranking the potential causes. A Pareto chart is an analysis tool that ranks categories of related data from most frequent to least frequent, typically in bar chart form. Thus, a fleet assessment Pareto chart uses historical engine service data for a particular type of engine to rank the various potential causes by the number of occurrences that each potential cause was the actual cause of a maintenance action. Thus, if two or more potential causes were supported equally by the supporting and discounting table analysis, the fleet assessment Pareto chart could be used as a "tie breaker." That is, for equally indicated potential causes, the cause having the higher number of occurrences on the fleet assessment Pareto chart would be given a higher ranking in the priority list.

The next step is to consult the urgency list table as shown in block 144. The urgency list table identifies those potential causes, such as high pressure turbine shroud burn through, which would pose a significant risk to the engine if they actually existed. Thus, if any of the potential causes listed in the step of block 138 are on the urgency list table, they need to be acted on first. These potential causes are thus moved to the top of the priority list, even if they were ranked lower in the ranking step of block 142.

At this point in the process, the possible causes of the detected performance shift have been identified and ranked in order of how they should be acted upon. However, before proceeding with the appropriate maintenance action, as determined by the process, the process proceeds to block 146. Here, the trend monitor questions whether he or she is sure of the trend data, the identified causes and the overall guidelines provided by the process. If not, the process proceeds to block 148 where the diagnostics center is notified for guidance on review status. Again, a trend monitor reaching this point in the process will not be able to utilize the process to determine an appropriate disposition and therefore must look to the diagnostic center for guidance on how to proceed. If the trend monitor is sure, then the process proceeds to block 150. In this step, a maintenance recommendation report that identifies the maintenance actions that should be taken is prepared. The maintenance recommendation report is based on the potential causes and rankings as determined by the process (i.e., the priority list) as well as any instructions or guidelines established by the customer, which is typically the engine owner and/or operator such as an airline.

The next step, at block 152, is to review the maintenance recommendation report with the diagnostic center to explain the findings and to obtain concurrence therewith. If the diagnostic center concurs with the maintenance recommendation report, it is then distributed to the customer, as indicated at block 154. The customer can then arrange to have the appropriate engine maintenance actions performed.

Once the recommended maintenance work has been completed, the process enters a feedback phase. Specifically, at block 156, the process inquires whether the actual cause or causes of the performance shift were found. If not, the process proceeds to block 158 where the diagnostics center is notified for guidance on how to proceed. If the underlying cause or causes are found, then the process proceeds to block 160 where the findings are documented. The last step, at block 162, is to gather relevant information from the engine service facility that performed the maintenance work. This information, such as hardware condition assessment and photographs, is then used together with the findings documented in the step of block 160 to update the various tables used in the process.

All of the tables discussed above and a flow chart setting forth all of the steps of the decision making process can be collected into a "manual" that can be used to guide the trend monitor through the process. As mentioned above, the decision making process can be implemented either electronically or in printed form. Thus, as used herein the term "manual" is intended to encompass both electronic and printed formats.

The foregoing has described a decision making process and manual for evaluating performance shifts identified during a diagnostic trend analysis of gas turbine engine data. While specific embodiments of the present invention have been described, it will be apparent to those skilled in the art that various modifications thereto can be made without departing from the spirit and scope of the invention as defined in the appended claims.

What is claimed is:

1. A decision making process for evaluating performance shifts identified during a diagnostic trend analysis of data obtained from a gas turbine engine, said process comprising the steps of:

determining whether each performance shift is actionable; and determining what maintenance action is required for actionable performance shifts by identifying potential causes of said actionable performance shifts and ranking said identified potential causes in most likely order.

2. The decision making process of claim 1 wherein said step of determining whether each performance shift is actionable includes determining whether each performance shift can be attributed to a cause not related to an engine condition requiring maintenance.

3. The decision making process of claim 1 wherein said step of determining whether each performance shift is actionable includes checking the persistence and magnitude of each performance shift.

4. The decision making process of claim 1 wherein said step of determining whether each performance shift is actionable includes determining for each performance shift whether said gas turbine engine data indicates that an urgent condition may exist.

5. The decision making process of claim 4 further comprising the step of notifying appropriate personnel if said gas turbine engine data indicates that an urgent condition may exist.

6. The decision making process of claim 1 wherein said step of determining whether each performance shift is actionable includes determining whether said gas turbine engine has been subject to a recent maintenance action.

7. The decision making process of claim 6 further comprising the step of determining if each performance shift can be attributed to a recent maintenance action when said gas turbine engine has been subject to a recent maintenance action.

8. The decision making process of claim 1 wherein said step of identifying potential causes of said actionable performance shifts includes using traditional and historical performance shift patterns.

9. The decision making process of claim 8 wherein said traditional performance shift patterns are based on gas turbine engine theory and general maintenance experience.

10. The decision making process of claim 8 wherein said historical performance shift patterns are based on actual engine maintenance experience.

11. The decision making process of claim 1 wherein said step of ranking said identified potential causes in most likely order includes using supporting and discounting data.

12. The decision making process of claim 1 wherein said step of ranking said identified potential causes in most likely order includes using a fleet assessment Pareto chart.

13. The decision making process of claim 1 wherein said step of ranking said identified potential causes in most likely order includes giving priority to any identified potential causes that pose a significant risk.

14. A decision making process for evaluating performance shifts identified during a diagnostic trend analysis of data obtained from a gas turbine engine, said process comprising the steps of:
  determining whether each performance shift can be attributed to a cause not related to an engine condition requiring maintenance;
  for performance shifts that cannot be attributed to a cause not related to an engine condition requiring maintenance, checking the persistence and magnitude of each performance shift;
  for performance shifts not having a sufficient persistence and magnitude, determining for each performance shift whether said gas turbine engine data indicates that an urgent condition may exist;
  for performance shifts having a sufficient persistence and magnitude or where said gas turbine engine data indicates that an urgent condition may exist, determining whether said gas turbine engine has been subject to a recent maintenance action;
  where said gas turbine engine has been subject to a recent maintenance action, determining if each performance shift can be attributed to said recent maintenance action;
  for performance shifts that cannot be attributed to said recent maintenance action and that have a sufficient persistence and magnitude, determining for each performance shift whether said gas turbine engine data indicates that an urgent condition may exist;
  for performance shifts that cannot be attributed to said recent maintenance action, using traditional and historical performance shift patterns to identify potential causes of each performance shift; and
  subsequently ranking said identified potential causes in most likely order.

15. The decision making process of claim 14 further comprising the step of continuing to watch said gas turbine engine data for performance shifts that can be attributed to a cause not related to an engine condition requiring maintenance.

16. The decision making process of claim 14 further comprising the step of continuing to watch said gas turbine engine data for performance shifts not having a sufficient persistence and magnitude and where said gas turbine engine data does not indicate that an urgent condition may exist.

17. The decision making process of claim 14 further comprising the step of continuing to watch said gas turbine engine data where said gas turbine engine has been subject to a recent maintenance action and performance shifts can be attributed to said recent maintenance action.

18. The decision making process of claim 14 further comprising the step of notifying appropriate personnel if said gas turbine engine data indicates that an urgent condition may exist.

19. The decision making process of claim 14 wherein said traditional performance shift patterns are based on gas turbine engine theory and general maintenance experience.

20. The decision making process of claim 14 wherein said historical performance shift patterns are based on actual engine maintenance experience.

21. The decision making process of claim 14 wherein said step of ranking said identified potential causes in most likely order includes using supporting and discounting data.

22. The decision making process of claim 14 wherein said step of ranking said identified potential causes in most likely order includes using a fleet assessment Pareto chart.

23. The decision making process of claim 14 wherein said step of ranking said identified potential causes in most likely order includes giving priority to any identified potential causes that pose a significant risk.

24. A manual for guiding a user through a decision making process for evaluating performance shifts identified during a diagnostic trend analysis of data obtained from a gas turbine engine, said manual comprising:
  a flow chart flow chart setting forth the steps of said decision making process;
  a false data check table having a number of questions designed to determine whether performance shifts can be attributed to a cause not related to an engine condition requiring maintenance;
  a persistence and magnitude table for indicating whether a performance shift's persistence and magnitude is sufficient to consider taking action on said performance shift;
  a notification criteria table having a number of questions designed to determine whether said gas turbine engine data indicates that an urgent condition may exist; and
  traditional and historical pattern match tables that identify potential causes of performance shift.

25. The manual of claim 24 further comprising a maintenance data effect table that lists limits for acceptable performance shift magnitudes for corresponding maintenance actions.

26. The manual of claim 24 further comprising a supporting and discounting table that lists data that support and data the discount potential causes of performance shift.

27. The manual of claim 24 further comprising urgency list table that identifies potential causes of performance shift that pose significant risk to gas turbine engines.

28. The manual of claim 24 further comprising a fleet assessment Pareto chart that ranks potential causes of performance shift by the number of occurrences that each potential cause actually caused a maintenance action.

* * * * *